United States Patent [19]

Pöll

[11] Patent Number: 5,056,656
[45] Date of Patent: Oct. 15, 1991

[54] STORAGE STRIP FOR GEMS OR OTHER SMALL PIECES

[75] Inventor: Martin Pöll, Fritzens, Austria

[73] Assignee: D. Swarovski & Co., Wattens, Austria

[21] Appl. No.: 504,115

[22] Filed: Apr. 3, 1990

[30] Foreign Application Priority Data

Apr. 14, 1989 [DE] Fed. Rep..of Germany ....... 3912336

[51] Int. Cl.$^5$ .............................................. B65D 83/00
[52] U.S. Cl. ....................................... 206/6.1; 53/492;
206/560; 206/566; 414/416; 414/786; 428/167
[58] Field of Search ................. 63/28; 53/381 R, 492;
206/6.1, 477, 478, 480, 560, 564, 566; 414/416,
417, 786; 428/15, 43, 67, 167, 174, 349

[56] References Cited

U.S. PATENT DOCUMENTS

| | | | |
|---|---|---|---|
| 3,417,865 | 12/1968 | Suverkropp et al. | 206/564 |
| 4,052,863 | 10/1977 | Poll | 428/67 |
| 4,353,765 | 10/1982 | Covi et al. | 428/67 |
| 4,573,575 | 3/1986 | Bergrath et al. | 206/564 |
| 4,650,077 | 3/1987 | Droz | 206/564 |

FOREIGN PATENT DOCUMENTS 0053203  6/1982  European Pat. Off. ............ 206/566

Primary Examiner—Jimmy G. Foster
Attorney, Agent, or Firm—Fay, Sharpe, Beall, Fagan, Minnich & McKee

[57] ABSTRACT

A storage strip for gems and other small pieces, comprising a plastic sheet having depressions for receiving the gems, the depressions conforming in shape with at least part of the profile of the gems to be positioned therein and being disposed in rows, and elastically deformable holding lips being provided adjacent the depressions. The gems or other pieces can be removed in simple fashion and using automated means after spreading apart the holding lips.

11 Claims, 4 Drawing Sheets

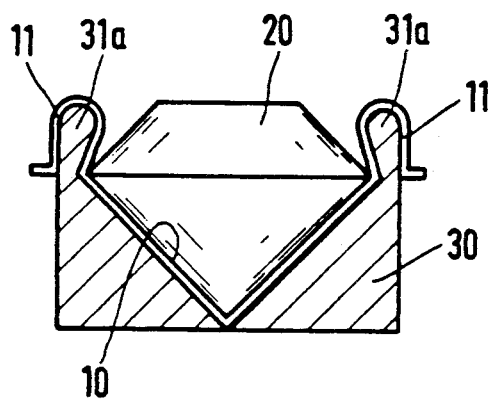
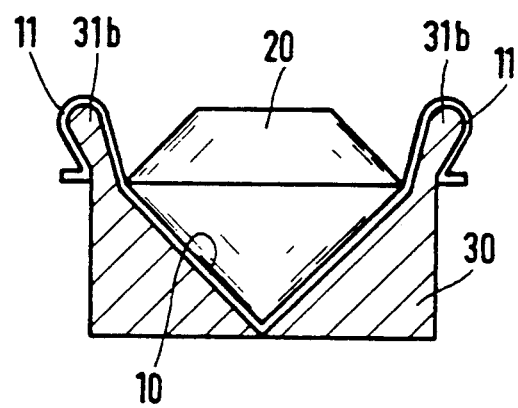
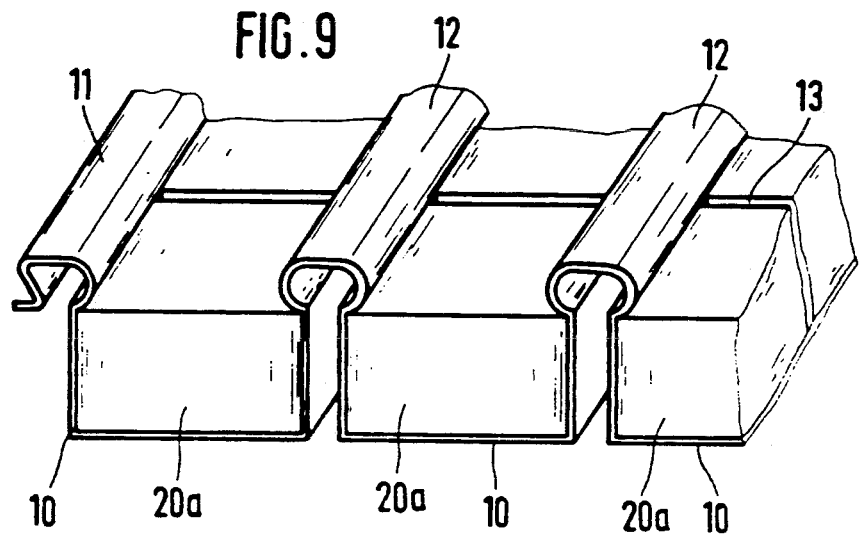
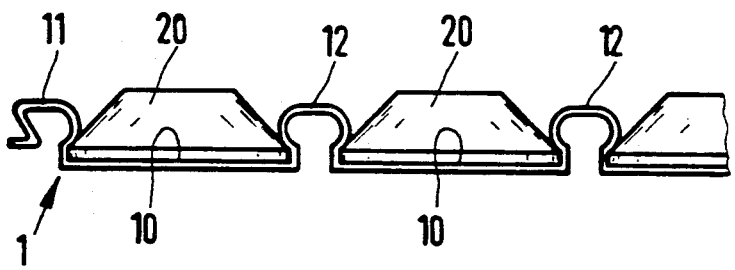

STORAGE STRIP FOR GEMS OR OTHER SMALL PIECES

The present invention relates to a supply strip for gems (or imitation gems) or other small pieces and to methods for removing the gems or other pieces from such storage strips.

The invention is based on the problem of providing a storage strip which ensures reliable positioning of the gems or other pieces, while allowing for simple, in particular automatic, removal.

The invention is based on the finding that this problem can be solved by a storage strip having depressions, the gems or other pieces being held in position in the depressions by holding lips.

The subject of the invention is a storage strip for gems or other small pieces, comprising a plastic sheet having depressions for receiving the gems, the depressions conforming in shape with at least part of the profile of the gems to be positioned therein and being disposed in rows, while holding lips are provided adjacent the depressions so as to engage, in the closed state, over the positioned gems and thereby fix them in position, and the holding lips are adapted to be disengaged from the gems by elastic deformation, this storage strip being characterized in that the holding lips extend continuously in the longitudinal or transverse direction of the strip and have a profile that is continuously open downwardly, so that they can be disengaged from the gems by stretching the storage strip perpendicular to the direction in which the holding lips are disposed.

The storage strip preferably has a plurality of parallel rows of depressions. It is also preferable for the holding lips to be disposed in the longitudinal direction of the storage strip.

The subject of the invention also includes methods for removing gems from a storage strip.

In the case of a storage strip having one longitudinal row of depressions, this is done by introducing the side legs of a guide track into the two outer holding lips of the filled storage strip, moving the storage strip along the guide track from a run-in portion with converging side legs to a removal portion with diverging side legs, so that when the outer holding lips run through the removal portion of the guide track they are spread apart against their resilient prestressing in the transverse direction of the sheet, and by removing the gems from the depressions using adhesive or suction means in the spread-apart position of the outer holding lips.

In the case of a storage strip having a plurality of parallel rolls of depressions, removal is performed by introducing the side legs of a substantially U-shaped guide track into the two outer holding lips of the filled storage strip, moving the storage strip along the guide track from a run-in portion with a smaller distance between the legs to a removal portion with a larger distance between the legs, so that when the inner holding lips located between the two outer holding lips run through the removal portion of the guide track said inner lips are spread apart against their resilient prestressing in the transverse direction of the storage strip, whereby at the same time the two outer locking lips are opened by introducing the side legs of a guide track into the two outer holding lips of the filled storage strip, moving the storage strip along the guide track from a run-in portion with converging side legs to a removal portion with diverging side legs, so that when the outer holding strips run through the removal portion of the guide track they are spread apart against their resilient prestressing in the transverse direction of the storage strip, and by removing the gems from the depressions using adhesive or suction means in the spread-apart position of all holding lips.

In the case of a storage strip whose holding lips are disposed in the transverse direction, removal is performed by stretching the storage strip in the longitudinal direction until the holding lips are disengaged from the gems or other small pieces and the latter can be removed.

The inventive storage strips are particularly suitable for small gems, in particular ones made of cut crystal glass, but also for any other small pieces having predefined dimensions, such as electronic components, for example.

Gems are currently marketed packed in small envelopes or bags. The gems thus come into the hands of the person working with them in a loose and disordered state. For automatic processing, the packaging of gems or other small pieces in a storage strip in exact, predefined positions is highly advantageous. One can in particular dispense with preparatory positioning of the gems using conveyor shakers or the like. When gems are to be processed manually, e.g. glued into jewelry using an adhesive or suction means, one can also attain a considerable increase in output since the gems can be removed from the strip in uniformly defined fashion. A reduction in the usual manipulation losses is a further advantage.

Further advantages are that the gems are positioned exactly. The quality control is facilitated. Using an adhesive or suction means one can pick up the gems faster. This form of presentation is in particular suitable for machine processing, for example for making kettle chains. It is very easy to check the quantity. The gems or other small pieces are optimally protected during transport. Improved product presentation and quality presentation are possible. It is easy to dispense partial amounts. This form of storage also protects the goods from being switched.

According to a preferred embodiment, the storage strips have covers on the top, in particular in the form of a plastic sheet. The advantage of this is, firstly, that the gems are protected from mechanical stress and, secondly and even more importantly, that the gems are protected from dust, moisture, etc., and can thus be processed in a "new" state even after long storage. The cover sheet can be welded or glued to the storage strip. It preferably bears a contact adhesive only in those areas, in particular the edge areas, where the sheetdoes not come in contact with the gems, so that when the sheet is removed gems do not stick to it. A further advantage of the cover sheet is that it can be printed on well to provide product information, e.g. on the size of the gems.

The invention shall be explained in more detail below with reference to the drawing which shows exemplary embodiments, and in which FIG. 1 shows a cross section of a first embodiment of the inventive storage strip having three rows of depressions to receive gems;

FIG. 5 shows a cross section of a second embodiment of the inventive storage strip for gems, which is introduced into the run-in portion of a guide track for the gems to be removed;

FIG. 6 shows a cross section of the removal portion of the guide track of FIG. 5;

FIG. 8 shows a cross section of a third embodiment of the inventive storage strip for gems; and FIG. 9 shows a cross section of a fourth embodiment of the inventive storage strip for right parallelepiped electronic components.

Figure 1:
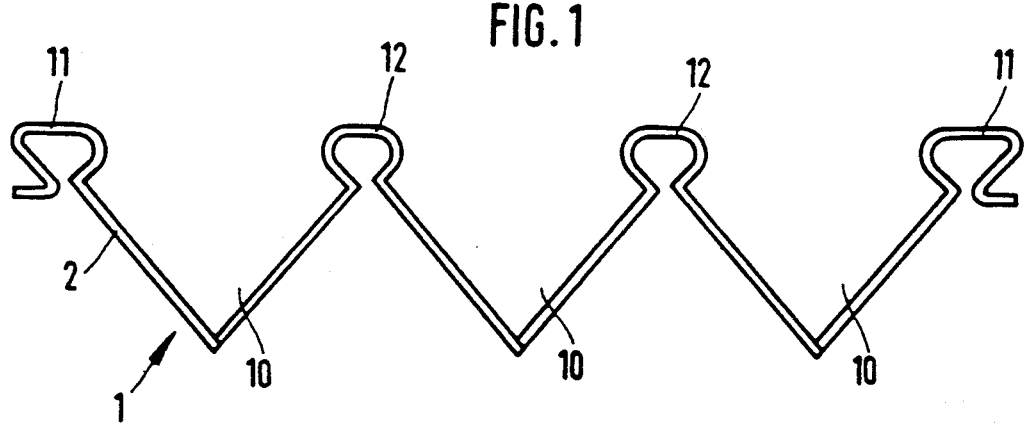

Storage strip 1 for "chaton" type gems that is illustrated in cross section in FIG. 1 comprises a thin plastic sheet. Particularly suitable sheets are made of polyvinyl chloride, polyethylene, polypropylene or polystyrene. The plastic sheetsusually have a thickness of 0.1 to 2 mm. The depressions forthe gems or other small pieces and the design of the holding lips are preferably provided by the deep drawing technique. However, the inventive storage strips may of course be made ofany materials by any methods.

The inventive storage strips are referred to as "strips" because their length is generally greater than their width. However, the term "storage strip" also includes sheet-like embodiments whose length and width are substantially equal.

The storage strip has at least one row of depressions for the gems. However, it may also have a plurality of parallel rows of depressions, namely two, three, or many more rows.

The diameter of the gems is preferably in the range of 1 to 10 mm. However, the storage strips are obviously also suitable for storing a wide range of sizes of gems or other small pieces.

Depressions 10 disposed in rows conform in shape with at least part of the profile of gems 20 to be positioned therein. As indicated by FIG. 1 in conjunction with FIG. 3, the profile of depressions 10 conforms with the conical profile of the bottom part of each "chaton" type gem 20. The design of the depressions and the holding lips cooperating therewith is such that tolerances in the gem dimensions are no problem; the gems or other pieces are always fixed in a certain position, i.e. they cannot come to lie crosswise or turn around.

Figure 2:
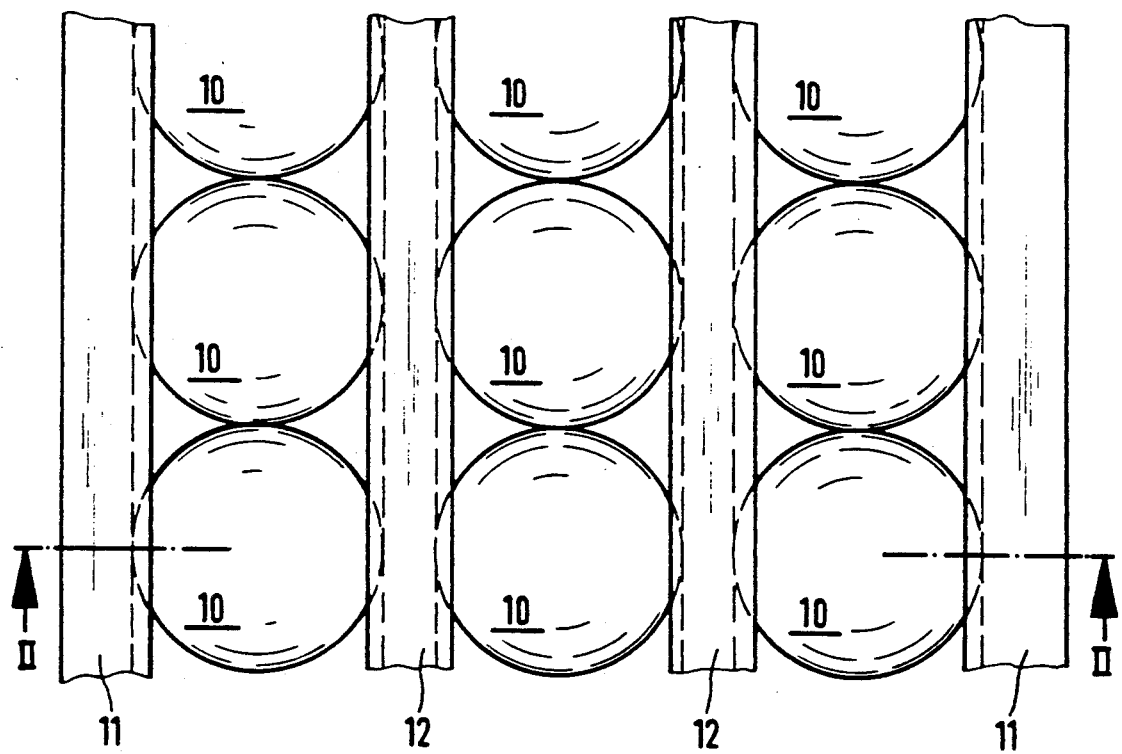
FIG. 2 shows a top view of a portion of the storage strip of FIG. 1.
Figure 2A:
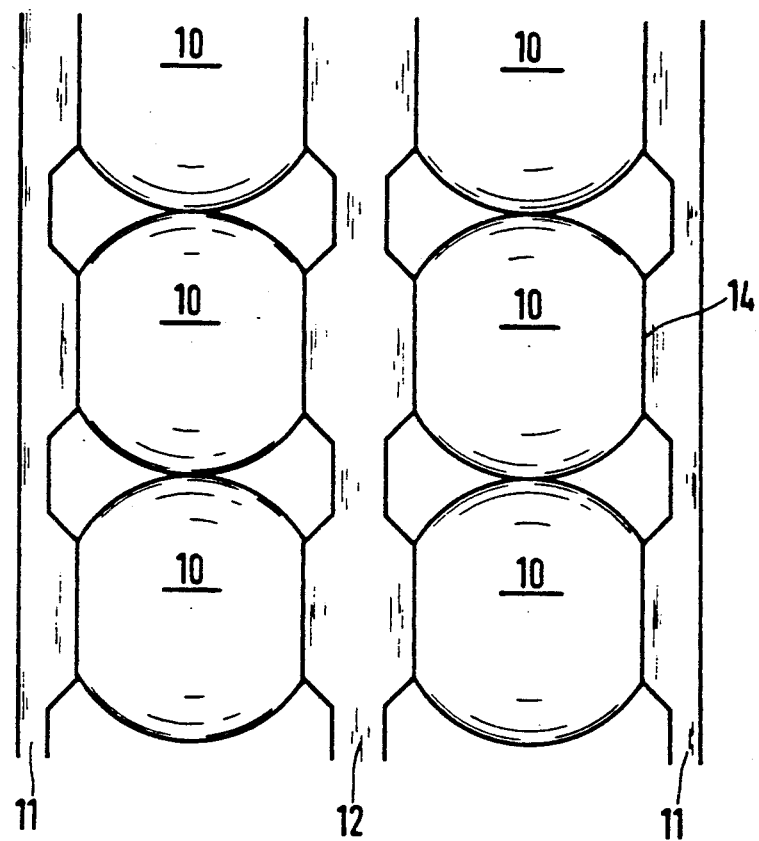
FIG. 2a shows a top view of a portion of a storage strip with differently constructed holding lips.

Holding lips 11 are preferably disposed in the longitudinal direction of the storage strip. However, they may also be perpendicular thereto. Holding lips 11 are continuous, whereby their design may be unchanged over their entire length, as shown in FIG. 2, or the holding lips may be more pronounced in the area of depressions 10 and reach further into the depression than in the areas between depressions 10, as shown in FIG. 2a.

The gems or other pieces are held by a holding lip 11 at least on one side. However, they are preferably fixed by the holding lips uniformly on opposite sides.

Holding lips 11 are resiliently prestressed and hold gems 20 in a fixed position after the latter have been pressed into depressions 10. To allow the gems to be pressed in, the holding lips are elastically deformable.

To remove the gems, one bends outer holding lips 11 outward, i.e. away from the gems, so that the lips are disengaged from the gems. One spreads apart inner holding lips 12 by stretching the storage strip transversely, as will be explained in more detail with reference to FIGS. 3 and 4.

To produce the storage strip shown in FIG. 1, depressions 10 and holding lips 11, 12 are formed by plastic deformation, in particular deep drawing. Holding lips 11, 12 limit the row of depressions 10 and run parallel to each other in the longitudinal direction of storage strip 1. The holding lips are formed in such a way as to be resiliently prestressed in the transverse direction of storage strip 1. When depressions 10 are filled with gems 20 the latter snap into depressions 10 against the spring force of holding lips 11, 12 and are grasped and held in the inserted state (cf. FIG. 4) with their upper truncated-conical portion by resilient holding lips 11, 12. This snap-in mounting of gems 20 ensures an exact positioning of gems 20 in the storage strip so that they cannot twist around during transport.

Holding lips 11, 12 may be high enough to protrude above the upper edge of inserted gems 20, thereby ensuring excellent protection of the gems from being damaged during transport.

Figure 3:
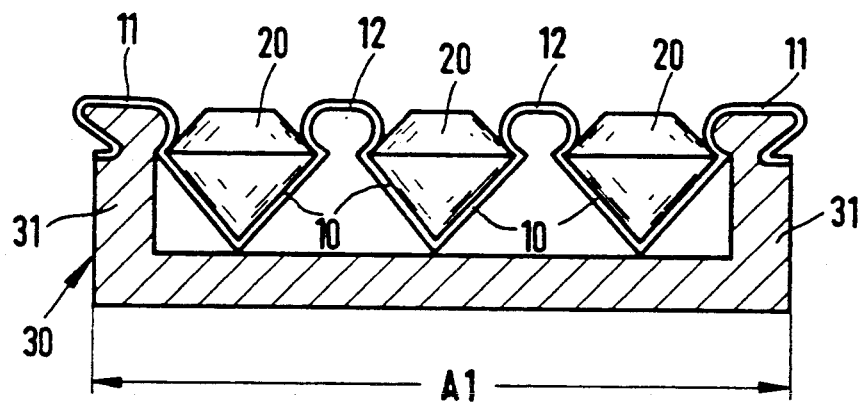
FIG. 3 shows a cross section of the run-in portion of a guide track in which the storage strip of FIG. 1 is inserted for the gems to be removed.
Figure 4:
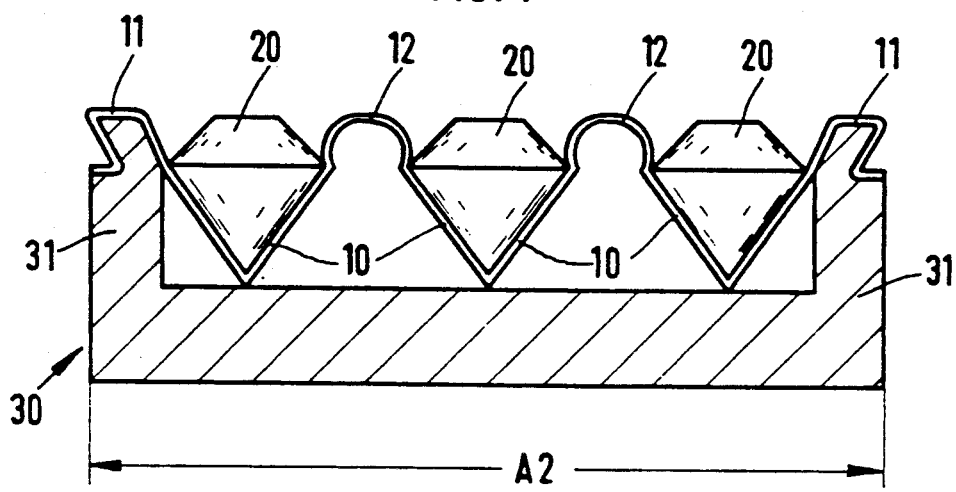
FIG. 4 shows a cross section of the removal portion of the guide track of FIG. 3.

A further essential advantage of the inventive storage strip is the way gems 20 are removed from storage strip 1, as illustrated in FIGS. 3 and 4, for processing, in particular automated processing.

For this purpose, filled storage strip 1 is introduced with its outer holding lips 11 into side legs 31 of a substantially U-shaped guide track 30, the end areas of side legs 31 conforming in shape with the profile of holding lips 11. The guide track has an introduction portion with a small distance A1 between the legs (FIG. 3) and a removal portion with a larger distance A2 between the legs (FIG. 4). The transition between these two track portions is continuous. The packaging introduced into side legs 31 is moved along guide track 30, whereby inner holding lips 12 of storage strip 1 are not yet subjected to any stretching forces in the transverse direction within the introduction portion as in FIG. 3.

This happens only due to the enlargement of distance A2 between the legs as in FIG. 4, which causes inner holding lips 12 to spread apart. Due to this spread, the truncated-conical upper portion of the "chaton" type gems 20 is freed from the holding force of inner locking lips 12. By outward bending of outer holding lips 11, as mentioned below with reference to FIGS. 5 and 6, gems 20 are also freed from the locking forceof outer holding lips 11, so that gems 20 can be readily removed for processing using adhesive or suction means (not shown) in the same positioning as that in which they were inserted. The working steps of introducing filled storage strip 1 into guide track 30, moving storage strip 1 along guide track 30 and removing released gems 20 from depressions 10 using adhesive or suction means can be performed fully automatically. The storage strip can be transported, for example, by a roller disposed on the underside, whereby carrier means engage behind depressions 10 from below and move storage strip 1 forward.

As indicated by FIG. 5, mainly the elastically deformable holding lips 12, and not depressions 10 of storage strip 1, are spread apart within the removal portion of guide track 30. This ensures that gems 20 maintain their original positions within depressions 10 even after removal of the holding forces by holding lips 12.

In order to spread apart outer holding lips 11 as well, the ends of side legs 31, which fit into outer holding lips 11, are passed over from an initially converting position as shown in FIG. 3 to a diverging position as shown in FIG. 4. This special feature is explained in more detail with reference to FIGS. 5 and 6.

Figure 7:
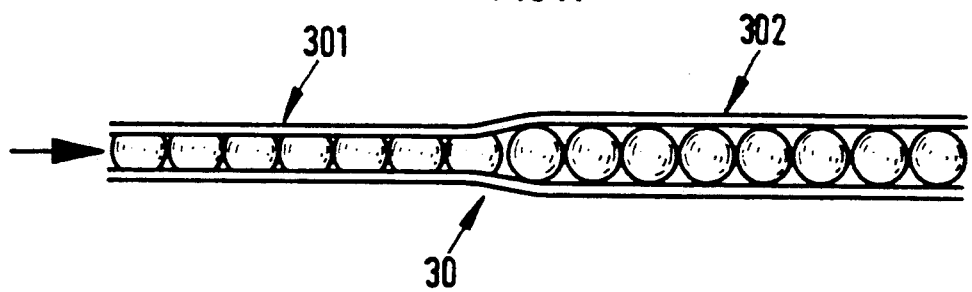
FIG. 7 shows a top view of the guide track of FIGS. 5 and 6.

FIGS. 5 and 6 show a storage strip with only one row of depressions 10, which are also formed for gems 20 of the "chaton" type. Guide track 30 used to remove gems 20 follows the wedge shape of the cross section of conical depressions 10. Guide track 30 shown from the top in FIG. 7 has an introduction portion 301 and a removal portion 302, a cross section of introduction portion 301 being shown in FIG. 5 and a cross section of removal portion 302 in FIG. 6. The side legs of guide track 30 referred to as 31a in FIG. 5 have within introduction portion 301 the above-mentioned converging position in which holding lips 11 introduced in side legs 31a remain in their holding position. Within removal portion 302 (FIG. 7) the side legs of guide track 30 referred to as 31b in FIG. 6 are changed to a diverging position, thereby spreading holding lips 11 apart in the transverse direction of storage strip 1. The transition from introduction portion 301 to removal portion 302 is preferably continuous. The storage strip is expediently transported by conveyor rollers engaging on the underside.

With an arrangement of holding lips 11, 12 perpendicular to the longitudinal direction of storage strip 1, gems 20 are released, and are thus removable, by stretching the storage strip in the longitudinal direction so that the holding lips are spread apart in the way shown in FIG. 3 and release the truncated-conical tops of gems 20.

FIG. 8 shows a further embodiment of the inventive storage strip for gems 20 of the "rose" type. Depressions 10 of storage strip 1 conform in shape with the trapezoid profile of these gems, i.e. they have a smooth flat bottom with holding lips 11, 12 joined directly to its outer edges. The gems protrude beyond holding lips 11, 12, as shown, if no protection for transport is required. Otherwise, holding lips 11, 12 are designed to protrude upwardly, as shown in the embodiment of FIG. 9 for right parallelepiped electronic components 20a. Electronic components 20a are disposed in depressions 10 which are limited by holding lips 11, 12 and partitions 13. The gems or electronic components are removed in the embodiments of FIGS. 8 and 9 in the same way as explained for FIGS. 3 and 4.

The above-mentioned adaptation of the shape of depressions 10 to the particular profile of the gems or other pieces, such as electronic components, to be inserted and held therein allows for a wide tolerance range, since the inserted gems or pieces are primarily held in the storage strip by the holding force of holding lips 11, 12 lying against them.

I claim:

1. A storage strip (1) for small pieces, comprising a plastic sheet having depressions (10) receiving the small pieces (20), the depressions (10) conforming in shape with at least part of the profile of the small pieces (20) to be positioned therein and being disposed in rows, said sheet including lips (11, 12) provided adjacent the depressions (10), and engaged in the closed state, over the positioned small pieces (20) to thereby fix them is position, and the holding lips (11, 12) are adapted to be disengaged from the small pieces (20) by elastic deformation, characterized in that the holding lips (11, 12) extend continuously in the longitudinal or transverse direction of the storage strip (1) and have a profile that is continuously open downwardly, so that they can be disengaged from the small pieces (20) by stretching the storage strip (1) perpendicular to the direction in which the holding lips (11, 12) are disposed.

2. The storage strip of claim 1, characterized in that a plurality of parallel rows of depressions (10) are provided.

3. The storage strip of claim 2 characterized in that the holding lips (11, 12) are disposed in the longitudinal direction of the storage strip (1).

4. The storage strip of claim 1 characterized in that the holding lips (11, 12) are disposed in the longitudinal direction of the storage strip (1).

5. An orienting means for orienting a plurality of small, identical objects in rows, the orienting means comprising:

a sheet, the sheet being easily elastically deformable, the sheet having depressions in the form of rows, the depressions having side walls, the depressions adapted for receiving a plurality of identical small objects, each of the identical small objects being received into the depressions in an identical orientation, the associated small objects being removable by elastic deformation of the sheet in a direction perpendicular to the rows.

6. The orienting means of claim 5 wherein the side walls of the depressions are configured to conform to the profile of the small objects received therein.

7. The orienting means of claim 5 further comprising:

holding lips along edges of the depressions, the lips extending partially over the small objects to secure them within the depressions.

8. A method of removing small pieces from a storage strip by means of a guide track and adhesive or suction means, the storage strip comprising resilient outer holding lips and depressions, the guide track including side legs, a run-in portion with converging side legs and a removal portion with diverging side legs, the method comprising the steps of introducing side legs (31) of a guide track (30) into outer holding lips (11) of a storage strip (1), moving the storage strip (1) along the guide track (3) from a run-in portion (301) with converging side legs (31a) to a removal portion (302) with diverging side legs (31b), spreading apart the outer holding lips (11) against their resilient prestressing in the transverse direction of the storage strip as the outer holding lips run through the removal portion (302) of the guide track (30), and removing the small pieces (20) from the depressions (10) using adhesive or suction means in the spread-apart position of the outer holding lips (11).

9. A method of removing small pieces from a storage strip by means of a guide track and adhesive or suction means, the storage strip comprising a plurality of parallel rows of depressions and resilient outer holding lips, the guide track including side legs, a run-in portion with converging side legs and a removable portion with diverging side legs, the method comprising the steps of introducing the side legs (31) of a substantially U-shaped guide track (30) into the two outer holding lips (11) of the filled storage strip (1), moving the storage strip (1) along the guide track (30) from a run-in portion with a smaller distance (A1) between the legs and converging side legs (31) to a removal portion with a larger distance (A2) between the legs and diverging side legs (31), spreading apart the inner holding lips (12) against their resilient prestressing in the transverse direction of the storage strip as the outer holding lips run through the removal portion of the guide track (31), and also spreading apart the outer holding lips (11) against their resilient prestressing as they run through the removal portion, and removing the small pieces (20) from the depressions (10) using adhesive or suction means in the spread-apart position of holding lips (11, 12).

10. A method of removing gems or other small pieces from a storage strip having one or more longitudinal rows of depressions and holding lips perpendicular to the longitudinal direction of the storage strip, characterized by the steps of stretching the storage strip (1) in the longitudinal direction until the holding lips (12) are disengaged from the gems (20), and removing the gems (20) from the depressions (10) using adhesive or suction means in the spread-apart position.

11. A guide track for removing small identical objects from a storage means, the storage means having outer holding lips, the guide track comprising:
- a run-in portion, the run-in portion having generally parallel side legs which cooperate with the outer holding lips to maintain the distance therebetween;
- a transition portion, the transition portion having diverging side legs; and,
- a removal portion having generally parallel side legs, the distance between the side legs of the removal portion being greater than the distance between the side legs of the run-in portion, the larger distance spreading the outer holding lips to facilitate removal of the small identical objects.

* * * * *